(12) United States Patent
Venkata Mittapalli et al.

(10) Patent No.: US 10,794,402 B2
(45) Date of Patent: Oct. 6, 2020

(54) EJECTOR AND A TURBO-MACHINE HAVING AN EJECTOR

(71) Applicant: GENERAL ELECTRIC COMPANY, Schenectady, NY (US)

(72) Inventors: Sridhara Rao Venkata Mittapalli, Bangalore (IN); Paul Alexander Intemann, Cincinnati, OH (US); Tarun Sharma, Bangalore (IN); Jeffrey Douglas Rambo, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 286 days.

(21) Appl. No.: 15/799,053

(22) Filed: Oct. 31, 2017

(65) Prior Publication Data
US 2019/0128289 A1 May 2, 2019

(51) Int. Cl.
*F04F 5/46* (2006.01)
*F04F 5/20* (2006.01)
*F04F 5/16* (2006.01)

(52) U.S. Cl.
CPC ............ *F04F 5/463* (2013.01); *F04F 5/16* (2013.01); *F04F 5/20* (2013.01)

(58) Field of Classification Search
CPC ...... F04F 5/16; F04F 5/20; F04F 5/463; F05D 2260/601
USPC ........................................ 417/151, 177, 179
See application file for complete search history.

(56) References Cited

U.S. PATENT DOCUMENTS

| | | | |
|---|---|---|---|
| 3,892,361 A | 7/1975 | Mocarski | |
| 3,936,382 A | 2/1976 | White | |
| 4,265,646 A | 5/1981 | Weinstein et al. | |
| 4,395,202 A | 7/1983 | Tell | |
| 4,400,138 A | 8/1983 | Baer | |
| 4,487,553 A | 12/1984 | Nagata | |
| 6,094,907 A | 8/2000 | Blackner | |
| 6,450,484 B1 | 10/2002 | Popov | |
| 6,550,253 B2 * | 4/2003 | Mortzheim | F01D 17/105 60/782 |
| 6,582,199 B1 | 6/2003 | Volkmann | |
| 6,951,312 B2 | 10/2005 | Casalmir et al. | |
| 7,152,410 B2 | 12/2006 | Sheoran et al. | |
| 7,578,369 B2 | 8/2009 | Francisco et al. | |
| 8,235,170 B1 | 8/2012 | Ertz et al. | |
| 8,245,494 B2 | 8/2012 | DeDe et al. | |

(Continued)

FOREIGN PATENT DOCUMENTS

EP 3219956 A2 9/2017
WO 2013174238 A1 11/2013

*Primary Examiner* — Patrick Hamo
*Assistant Examiner* — Chirag Jariwala
(74) *Attorney, Agent, or Firm* — Dority & Manning, P.A.

(57) ABSTRACT

An ejector is presented. The ejector includes a primary fluid inlet to receive a primary fluid. The ejector further includes a secondary fluid inlet to receive a secondary fluid. Furthermore, the ejector includes a nozzle fluidly coupled to the primary fluid inlet and the secondary fluid inlet. The nozzle includes a secondary pilot inlet to receive at least a portion of the secondary fluid from the secondary fluid inlet, and a nozzle outlet including a plurality of primary openings for discharging the primary fluid and a secondary opening for discharging the secondary fluid. A turbo-machine having the ejector is also presented.

19 Claims, 5 Drawing Sheets

(56) References Cited

U.S. PATENT DOCUMENTS

| | | | |
|---|---|---|---|
| 8,465,264 B2* | 6/2013 | Sampson | B01F 3/02 |
| | | | 261/76 |
| 8,505,310 B2 | 8/2013 | Zhang et al. | |
| 8,556,027 B2 | 10/2013 | Francisco et al. | |
| 9,222,410 B2* | 12/2015 | Chillar | F02C 6/08 |
| 2006/0027679 A1 | 2/2006 | Gratteau | |
| 2010/0096474 A1 | 4/2010 | Zhang et al. | |
| 2010/0170265 A1 | 7/2010 | Whaling et al. | |
| 2013/0167566 A1* | 7/2013 | Alahyari | F25B 41/00 |
| | | | 62/115 |
| 2015/0308461 A1 | 10/2015 | Tell | |
| 2016/0186783 A1 | 6/2016 | Nishijima et al. | |

* cited by examiner

EJECTOR AND A TURBO-MACHINE HAVING AN EJECTOR

BACKGROUND

Embodiments of the present specification relate to an ejector and, more particularly, to an ejector having an improved nozzle employed in a turbo-machine.

Ejector is a pump like device in which a low-energy fluid may be entrained with a high-energy fluid, by expanding a high-energy fluid. Ejectors are commonly used in a turbo-machine, such as a gas turbine for pumping the low-energy fluid from one section to another section by utilizing a kinetic energy of the high-energy fluid. The ejector may utilize momentum of a motive flow of the high-energy fluid through a nozzle to create a suction flow of low-energy fluid surrounding the nozzle to mix the high-energy fluid and the low-energy fluid. Interlayer shear may operate between the high-energy fluid and low-energy fluid within the ejector resulting in an entrainment (suction flow) of the low-energy fluid with the high-energy fluid stream. To improve efficiency of the ejector and to reduce operating costs of the turbo-machine, it may be desirable to increase an entrainment ratio of the low-energy fluid and the high-energy fluid, to facilitate faster mixing of the high-energy fluid and the low-energy fluid, or both.

BRIEF DESCRIPTION

In accordance with one embodiment of the present specification, an ejector is presented. The ejector includes a primary fluid inlet to receive a primary fluid. The ejector further includes a secondary fluid inlet to receive a secondary fluid. Furthermore, the ejector includes a nozzle fluidly coupled to the primary fluid inlet and the secondary fluid inlet. The nozzle includes a secondary pilot inlet to receive at least a portion of the secondary fluid from the secondary fluid inlet, and a nozzle outlet including a plurality of primary openings for discharging the primary fluid and a secondary opening for discharging the secondary fluid.

In accordance with another embodiment of the present specification, an ejector is presented. The ejector includes a fluid suction section. The fluid suction section includes a primary fluid inlet to receive a primary fluid, a secondary fluid inlet to receive a secondary fluid, and a nozzle fluidly coupled to the primary fluid inlet and the secondary fluid inlet. The nozzle includes a secondary pilot inlet to receive at least a portion of the secondary fluid from the secondary fluid inlet. The nozzle further includes a nozzle outlet including a plurality of primary openings for discharging the primary fluid and a secondary opening for discharging the secondary fluid. The ejector further includes mixing tube fluidly coupled to the fluid suction section and configured to receive the primary fluid and the secondary fluid from the fluid suction section, and mix the primary fluid with the secondary fluid to form a mixed fluid stream. Furthermore, the ejector includes a diffuser fluidly coupled to the mixing tube to discharge the mixed fluid stream.

In accordance with yet another embodiment of the present specification, a turbo-machine is presented. The turbo-machine includes a high-pressure source of a primary fluid. The turbo-machine further includes a low-pressure source of a secondary fluid. Furthermore, the turbo-machine includes a target unit. Moreover, the turbo-machine includes ejector fluidly coupled to the high-pressure source, the low-pressure source, and the target unit. The ejector includes a primary fluid inlet to receive a primary fluid. The ejector further includes a secondary fluid inlet to receive a secondary fluid. Furthermore, the ejector includes a nozzle fluidly coupled to the primary fluid inlet and the secondary fluid inlet. The nozzle includes a secondary pilot inlet to receive at least a portion of the secondary fluid from the secondary fluid inlet, and a nozzle outlet including a plurality of primary openings for discharging the primary fluid and a secondary opening for discharging the secondary fluid.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be noted that the term "fluid" as used herein includes any medium or material that flows, including, but not limited to, gas, liquid, or a combination thereof. In some embodiments, the term "fluid" as used herein includes particle-laden gas, particle-laden liquid, or combination thereof. Particles carried by such particle-laden gas or particle-laden liquid may include impurities including, but not limited to, dust particles, slurry particles, unburnt fuel particles, ash particles, carbon particles, or combinations thereof. Moreover, the terms "fluidly coupled" or "fluidly coupling", as used herein, refer to an arrangement or a connection between two components that facilitates flow of fluid from one component to another component, or viceversa. Moreover, the term "entrainment ratio" as used herein refers to a ratio of a mass flow rate a secondary fluid (e.g., a low-energy fluid) and a mass flow rate of a primary fluid (e.g., a low-energy fluid) in an ejector. The entrainment ratio may be obtained by dividing the mass flow rate of the secondary fluid in the ejector by the mass flow rate of the primary fluid in the ejector.

Figure 1:
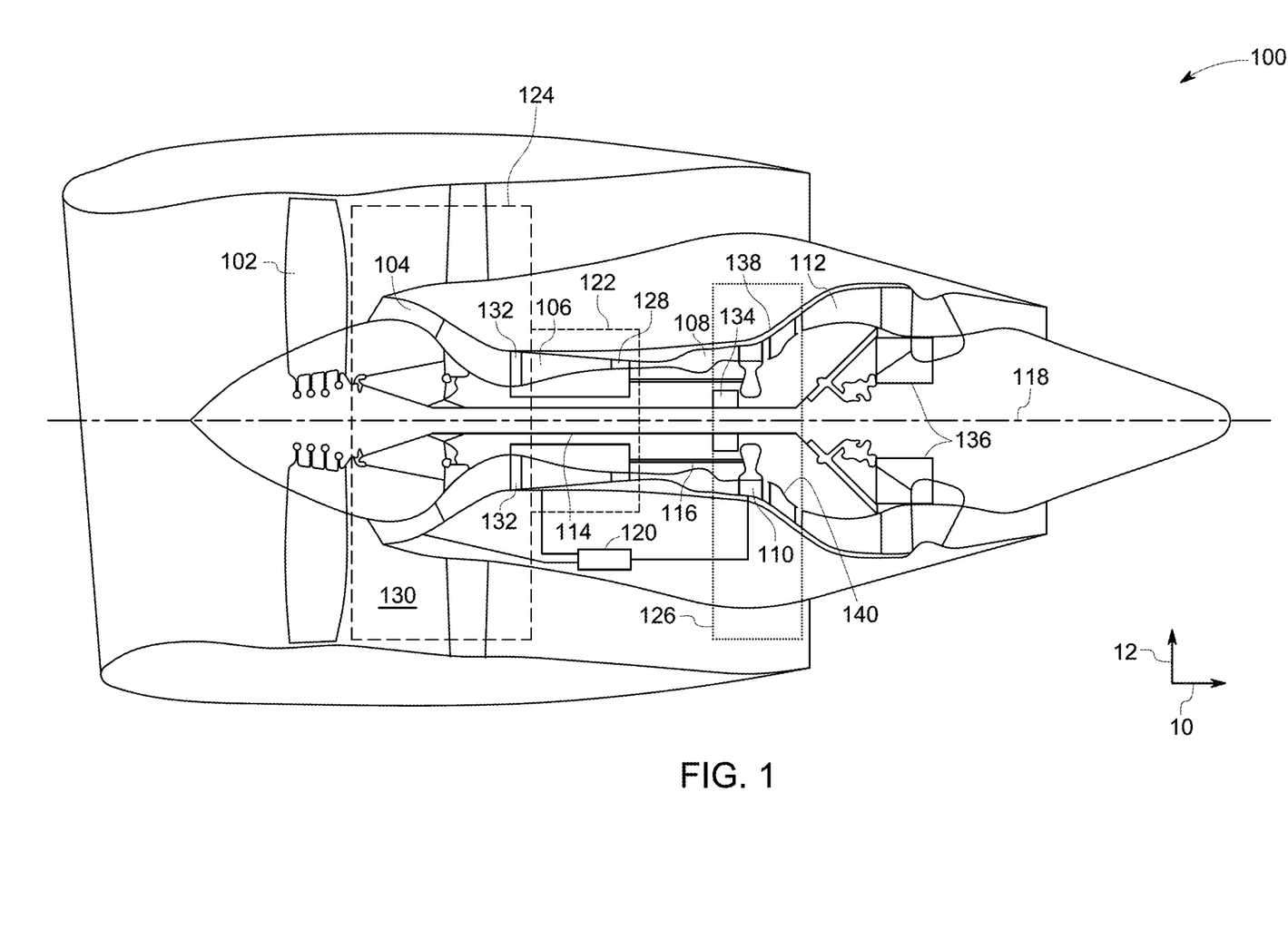
FIG. 1 is a schematic diagram of a turbo-machine, in accordance with one embodiment of the present specification.

FIG. 1 is a schematic diagram of a turbo-machine 100, in accordance with one embodiment of the present specification. Reference numerals 10 and 12 respectively represent an axial direction and a radial direction of the turbo-machine 100. In some embodiments, the turbo-machine 100 may include a fan 102, a low-pressure compressor 104, a high-pressure compressor 106, a combustor assembly 108, a high-pressure turbine 110, and a low-pressure turbine 112 arranged serially in the axial direction 10 of the turbo-machine 100, as depicted in FIG. 1. The low-pressure compressor 104 is coupled to the low-pressure turbine 112 via a first shaft 114. The high-pressure compressor 106 is coupled to the high-pressure turbine 110 via a second shaft 116. The reference numeral 118 represents a centerline of the turbo-machine 100. In some embodiments, the low-pressure compressor 104, the high-pressure compressor 106, the high-pressure turbine 110, and/or the low-pressure turbine 112 may include a plurality of stages (not shown). Each stage may include a plurality of blades (not shown) mounted on the respective shafts 114, 116.

During operation of the turbo-machine 100, the fan 102 diverts a fluid (e.g., air) toward the low-pressure compressor 104. The low-pressure compressor 104 compresses the incoming fluid and directs the compressed fluid to the high-pressure compressor 106. The high-pressure compressor 106 further compresses the fluid from the low-pressure compressor 104 and discharges the compressed fluid to the combustor assembly 108. The compressed fluid is mixed with one or more fuels in the combustor assembly 108. Subsequently, the mixture of the compressed fluid and the one or more fuels is combusted within the combustor assembly 108 to form a combustion gas. The combustion gas is discharged from the combustor assembly 108 to the turbines 110, 112. The combustion gas is expanded in the high-pressure turbine 110 and the low-pressure turbine 112 thereby rotating the turbines 110, 112.

The turbo-machine 100 further includes an ejector 120. Although one ejector 120 is shown in FIG. 1, a turbo-machine 100 including more than one ejectors is also envisioned within the scope of the present specification.

The ejector 120 is fluidly coupled to a high-pressure source 122 of a primary fluid, a low-pressure source 124 of a secondary fluid, and a target unit 126 as depicted in FIG. 1. For example, the ejector 120 is fluidly coupled between the high-pressure source 122 of the primary fluid and the target unit 126, and between the low-pressure source 124 of the secondary fluid and the target unit 126. The ejector 120 may be employed to entrain the secondary fluid from the low-pressure source 124 using a kinetic energy of the primary fluid received from the high-pressure source 122 and generate mixed fluid stream of the primary fluid and the secondary fluid. The ejector 120 is further configured to supply the mixed fluid stream of the primary fluid and the secondary fluid to the target unit 126. In some embodiments, the primary fluid has higher energy or pressure than the secondary fluid.

In some embodiments, as depicted in FIG. 1, the high-pressure source 122 may be the high-pressure compressor 106. By way of example, one or more aft stages 128 of the high-pressure compressor 106 or a discharge fluid stream of the high-pressure compressor 106 may be connected as the high-pressure source 122 to the ejector 120. In some embodiments, the low-pressure source 124 may include the low-pressure compressor 104, an inlet for ambient air 130, or both the low-pressure compressor 104 and the inlet for ambient air 130. By way of example, one or more forward stages 132 of the low-pressure compressor 104 may be connected as the low-pressure source 124 to the ejector 120. The term "target unit" as used herein may be representative of any element, inside or outside, the turbo-machine 100 where a flow of fluid is desired. In some embodiments, the target unit 126 may include an oil sump 134, a balance piston 136, the turbines 110, 112, or combinations thereof. In some embodiments, a casing 138 of one or more of the turbines 110, 112, a center frame 140 of one or more of the turbines 110, 112, or combinations thereof may also represent the target unit 126 for the ejector 120.

In a non-limiting embodiment of FIG. 1, the ejector 120 is shown as fluidly coupled between the high-pressure compressor 106 (i.e., the high-pressure source 122) and the high-pressure turbine 110 (i.e., the target unit 126), and between the low-pressure compressor 104 (i.e., low-pressure source 124) and the high-pressure turbine 110 (i.e., the target unit). The ejector 120 may facilitate cooling of the casing of the high-pressure turbine 110. Without limiting the scope of the present specification, the ejector 120, alternatively or additionally, may be disposed at various other places in the turbo-machine 100. Further details of the ejector 120 is described in conjunction with FIGS. 2-5.

It may be noted that although various embodiments of the ejector 120 are described with respect to the turbo-machine 100, the ejector 120, without limiting the scope of the present specification, may be employed in any other machine where such pumping action is desirable.

Figure 2:
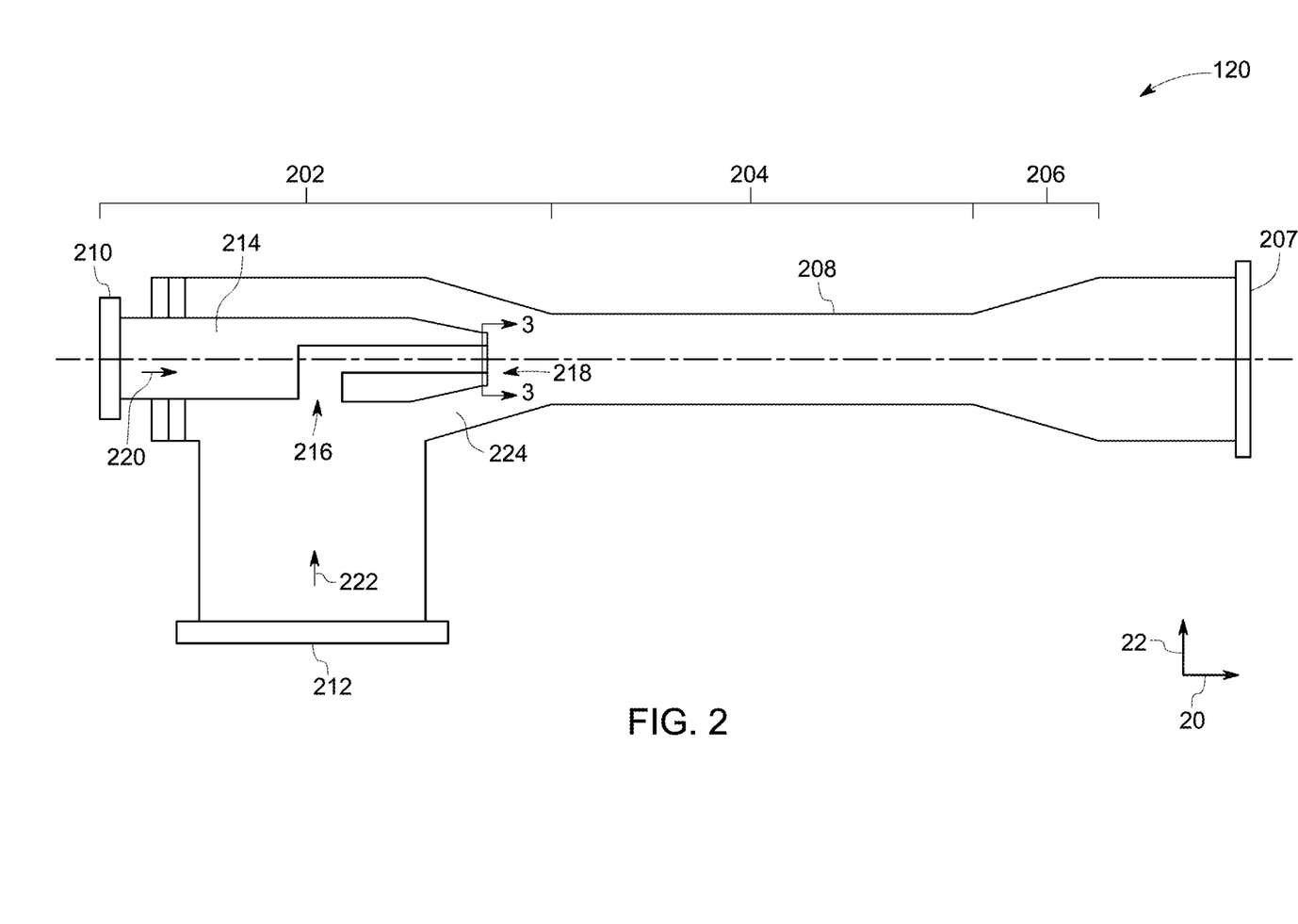
FIG. 2 is a schematic diagram of an ejector used in the turbo-machine of FIG. 1, in accordance with one embodiment of the present specification.

FIG. 2 is a schematic diagram of the ejector 120 used in the turbo-machine 100 of FIG. 1, in accordance with one embodiment of the present specification. Reference numerals 20 and 22 respectively represent an axial direction and a radial direction of the ejector 120. In some embodiments, the ejector 120 includes a fluid suction section 202, a mixing tube 204, and a diffuser 206 arranged serially as depicted in FIG. 2. The reference numeral 207 represents an exit of the ejector 120. The reference numeral 208 represents a housing of the ejector 120.

In some embodiments, the fluid suction section 202 includes a primary fluid inlet 210 to receive the primary fluid. The primary fluid is represented in FIG. 2 by an arrow 220. The fluid suction section 202 further includes a secondary fluid inlet 212 to receive the secondary fluid. The secondary fluid is represented in FIG. 2 by an arrow 222. As mentioned earlier, the primary fluid inlet 210 may be fluidly coupled to the high-pressure source 122 (e.g., the high-pressure compressor 106) to receive the primary fluid. Similarly, the secondary fluid inlet 212 may be fluidly coupled to the low-pressure source 124 (e.g., the low-pressure compressor 104) to receive the secondary fluid.

Moreover, the fluid suction section 202 includes a nozzle 214. The nozzle 214 includes a secondary pilot inlet 216 and a nozzle outlet 218. The nozzle 214 is fluidly coupled to the primary fluid inlet 210 and the secondary fluid inlet 212. The nozzle 214 facilitates suction of the secondary fluid from the secondary fluid inlet 212. In some embodiments, the nozzle 214 is fluidly coupled to the primary fluid inlet 210 to receive the primary fluid. Further, the nozzle 214 is fluidly coupled to the secondary fluid inlet 212 via the secondary pilot inlet 216 and receives at least a portion of the secondary fluid from the secondary fluid inlet 212 via the secondary pilot inlet 216. Although the nozzle 214 having one secondary pilot inlet 216 is shown in FIG. 2, in some embodiments, the secondary pilot inlet 216 may include a plurality of secondary pilot inlets 216. In some embodiments, for example, in the configuration of FIG. 2, the nozzle 214 discharges streams/jets of the primary fluid and the secondary fluid into the fluid suction section 202 via the nozzle outlet 218. In some embodiments, a length of an ejector may be selected such that the streams/jets of the primary fluid and the secondary fluid are discharged into the mixing tube 204. Further details of the nozzle outlet 218 are described in conjunction with FIG. 3.

Figure 3:
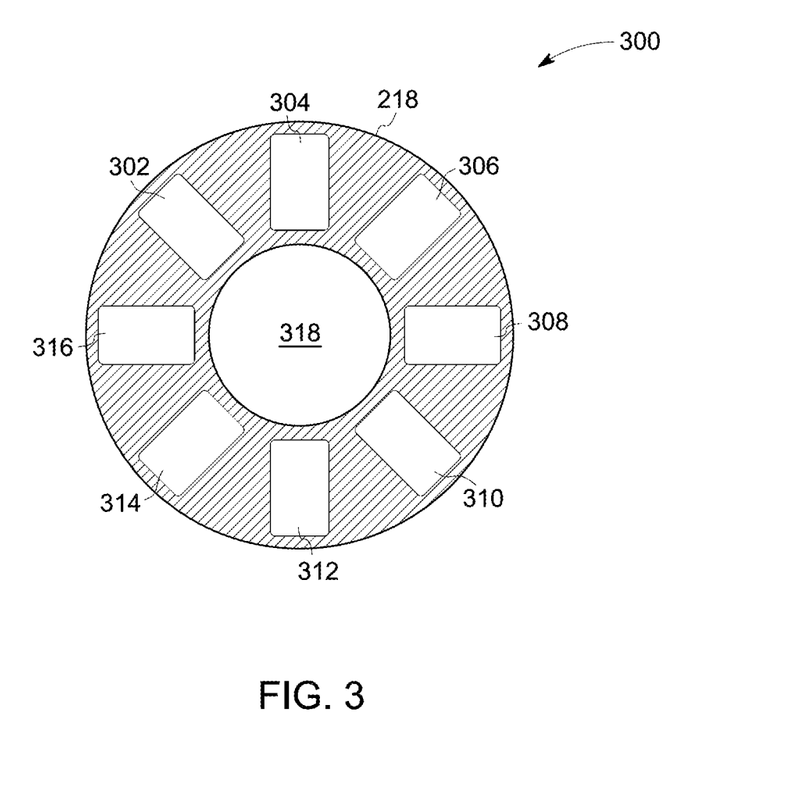
FIG. 3 is a cross-sectional view of a nozzle outlet of a nozzle of the ejector of FIG. 2, in accordance with one embodiment of the present specification.

Referring now to FIG. 3, a cross-sectional view 300 of the nozzle outlet 218 of the ejector 120 of FIG. 2 is presented, in accordance with one embodiment of the present specification. The cross-sectional view 300 represents a cross-section of the nozzle 214 along a plane 3-3 as depicted in FIG. 2. As depicted in FIG. 3, the nozzle outlet 218 includes a plurality of primary openings 302, 304, 306, 308, 310, 312, 314, and 316 for discharging the primary fluid and a secondary opening 318 for discharging the secondary fluid. The plurality of primary openings 302, 304, 306, 308, 310, 312, 314, and 316 are hereinafter collectively referred to as primary openings 302-316. A jet of the primary fluid may be discharged from the nozzle 214 via each of the plurality of primary openings 302-316. Similarly, a jet of the secondary fluid may be discharged from the nozzle 214 via the secondary opening 318. In some embodiments, the secondary opening may also include a plurality of secondary openings 318. In some embodiments, the nozzle 214 may include one secondary pilot inlet 216 and a plurality of secondary openings 318. In FIG. 3, eight primary openings 302-316 and one secondary opening 318 are shown for illustration. It may be noted that any number of primary openings 302-316 and the secondary opening 318 may be formed in the nozzle outlet 218, depending on the design and specification requirement of the ejector 120.

Although the embodiments of the present specification are not limited with respect to cross-sectional shapes and orientations of the primary openings 302-316 and the secondary opening 318, the primary openings 302-316 having a rectangular shape and the secondary opening 318 having a circular shape are depicted in FIG. 3 for illustration purpose. Non-limitation examples of the cross-sectional shape of the primary openings 302-316 and the secondary opening 318 include a circular shape or any non-circular shape such as, but not limited to, a square shape, a rectangular shape, a hexagonal shape, a trapezoidal shape, elliptical shape, or combinations thereof. Moreover, in some embodiments, the primary openings 302-316 may be arranged at angular positions different from positioning of the primary openings 302-316 depicted in FIG. 3. In some embodiments, for example, as shown in FIG. 3, the secondary opening 318 may have a different shape than that of the primary openings 302-316. In some embodiments, the secondary opening 318 may be of same shape as that of the primary openings 302-316.

In some embodiments, the primary openings 302-316 and the secondary opening 318 may be arranged to achieve enhanced shear layer interaction of the jets of the primary fluids and jet(s) of the secondary fluid. FIG. 3 depicts one such non-limiting example arrangement, where the secondary opening 318 is surrounded by the primary openings 302-316, arranged in a circular fashion. It is to be noted that the embodiments of the present specification are not limited with respect to the arrangement of the primary openings 302-316 and the secondary opening 318 illustrated in FIG. 3. By way of example, in some embodiments, the nozzle 214 may include a plurality of primary openings 302-316 and a plurality of secondary openings 318 (collectively referred to as 318). In some such embodiments, the plurality of primary openings 302-316 and a plurality of secondary openings 318 are arranged such that at least one secondary opening 318 is disposed between one or more of the plurality of primary openings 302-316. In some embodiments, the plurality of primary openings 302-316 and a plurality of secondary openings 318 are arranged such that the primary openings 302-316 are surrounded by plurality of the secondary openings 318.

In some embodiments, the primary openings 302-316 and the secondary opening 318 are located at a same axial location within the ejector 120, for example, as depicted in the nozzle 214 of FIG. 2. In some embodiments, the primary openings 302-316 and the secondary opening 318 may be staggered in the axial direction 20 of the ejector 120 (see FIG. 5). In some embodiments, the nozzle 214 further includes a plurality of conduits that fluidly couple the primary fluid inlet 210 to the plurality of primary openings 302-316 and the secondary pilot inlet 216 to the secondary opening 318. Additional details of the conduits are described in conjunction with FIG. 4.

Figure 4:
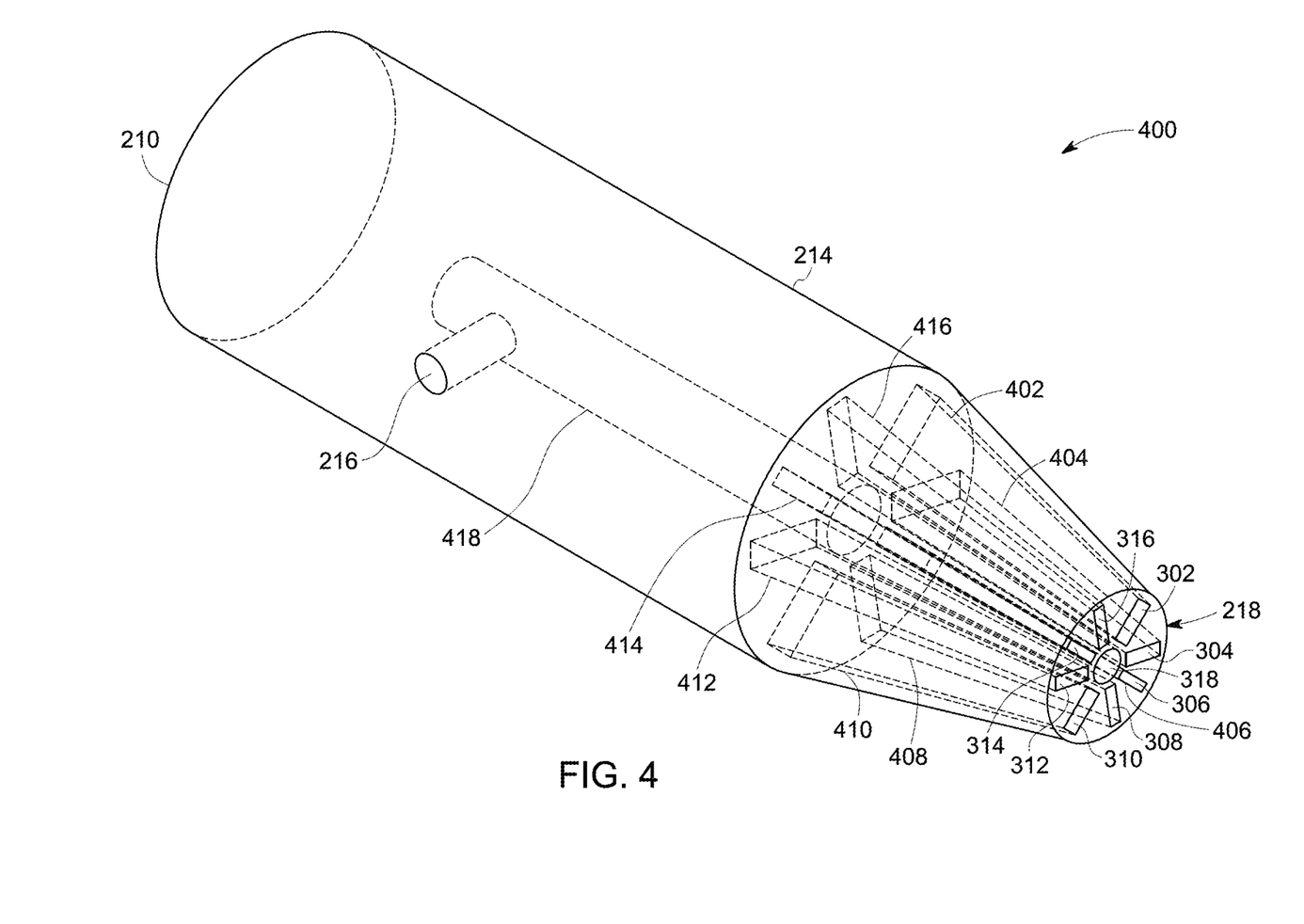
FIG. 4 is a schematic diagram of a nozzle of the ejector of FIG. 2, in accordance with one embodiment of the present specification.

Referring now to FIG. 4, a schematic diagram 400 of the nozzle 214 of the ejector 120 of FIG. 2 is presented, in accordance with one embodiment of the present specification. In some embodiments, as depicted in FIG. 4, the nozzle 214 may include a plurality of primary conduits 402, 404, 406, 408, 410, 412, 414, and 416, fluidly coupling the primary fluid inlet 210 to the plurality of primary openings 302, 304, 306, 308, 310, 312, 314, and 316, respectively, of the nozzle outlet 218. The plurality of primary conduits 402, 404, 406, 408, 410, 412, 414, and 416 are hereinafter collectively referred to as primary conduits 402-416. The primary fluid received at the primary fluid inlet 210 is diverted into the primary conduits 402-416 and discharged via the respective primary openings 302-316.

Additionally, the nozzle 214 may also include a secondary conduit 418 fluidly coupling the secondary pilot inlet 216 to the secondary opening 318 of the nozzle outlet 218. The secondary conduit 418 provides a flow path for the secondary fluid entering the secondary pilot inlet 216 to the secondary opening 318. The secondary fluid is then discharged via the secondary opening 318. Moreover, as previously noted, in some embodiments, the secondary pilot inlet 216 may include a plurality of secondary pilot inlets 216 and the secondary opening 318 may include a plurality of secondary openings 318. In such embodiments, the nozzle 214 may also include a plurality of secondary conduits 418 fluidly coupling the plurality of secondary pilot inlets 216 to the plurality of secondary openings 318.

As described earlier, and referring again to FIG. 2, during operation of the ejector 120, the nozzle 214 discharges jets of the primary fluid and the secondary fluid into the fluid suction section 202 from the respective primary openings 302-316 and secondary opening 318. The kinetic energy of the discharged jets of the primary fluid causes suction of the secondary fluid from the secondary fluid inlet 212 via an annular cavity 224 surrounding the nozzle 214. In accordance with embodiments of the specification, as the primary fluid is discharged via a plurality of jets, surface area for interaction between primary fluid and the secondary fluid increases. Such an increase in the surface area results in an increase in the shear layer interaction between the primary fluid and the secondary fluid. This may advantageously result in increased entrainment ratio. Further, the discharge of the secondary fluid via the secondary opening 318 of the nozzle outlet 218 further may increase the surface area for interaction between the primary fluid and the secondary fluid resulting in further enhancement of the suction of the secondary fluid via the secondary fluid inlet 212.

The mixing tube 204 receives the primary and secondary fluids discharged via the nozzle 214 and the sucked secondary fluid via the secondary fluid inlet 212. The mixing tube 204 is a conduit where the primary fluid and the secondary fluids are mixed with each other. In some embodiments, a diameter of the mixing tube 204 may be chosen based on a desired flow rate and a desired discharge pressure from the ejector 120. The mixing tube 204 mixes the primary fluid with the secondary fluid to form a mixed fluid stream. As will be appreciated, in accordance with embodiments of the specification, the discharge of the secondary fluid via the secondary opening 318 of the nozzle outlet 218 may also result in mixing of the primary fluid and the secondary fluid at a shorter mixing length in comparison to the conventional ejectors, at least in part due to the increased shear layer interaction between the primary fluid and the secondary fluid. Accordingly, a mixing length, which is a distance at which the primary fluid and the secondary fluid are mixed with each other, may also reduce.

The diffuser 206 is a divergent portion of ejector 120 that discharges the mixed fluid stream toward the target unit 126. In some embodiments, the diffuser 206 facilitates recovery of the static pressure with minimum total pressure loss of the mixed fluid stream. The diffuser 206 may be fluidly coupled to the target unit 126 (described in detail earlier) via one or more conduits.

Figure 5:
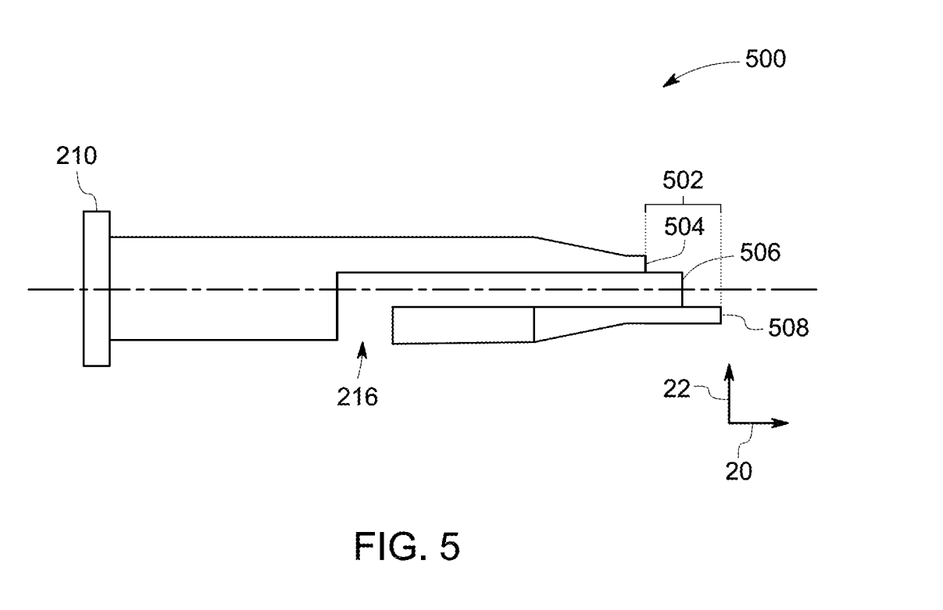
FIG. 5 is a schematic diagram of a nozzle, in accordance with one embodiment of the present specification.

FIG. 5 is a schematic diagram of a nozzle 500, in accordance with one embodiment of the present specification. The nozzle 500 may be representative of one embodiment of the nozzle 214 of FIG. 2 and may be employed in the ejector 120 as an alternative to the nozzle 214. The nozzle 500 may include one or more elements similar to the corresponding elements of the nozzle 214, description of which is not repeated herein. While some elements of the nozzle 500 are similar to the elements of the nozzle 214, a nozzle outlet 502 of the nozzle 500 has a configuration different from the nozzle outlet 218 of the nozzle 214. In the non-limiting example of FIG. 5, the nozzle outlet 502 includes three stages 504, 506, and 508 located at a same or different axial distance from one another. The primary openings 302-316 and the secondary opening 318 may be formed in the nozzle 500 such that primary openings 302-316 and the secondary opening 318 are staggered in the axial direction 20 of the ejector 120 or the nozzle 500. The primary openings 302-316 and the secondary opening 318 may be arranged in two or more stages staggered in the axial direction 10 of the ejector 120. By way of example, the primary openings 302, 304, and 306 may be located in stage 504, the primary openings 308, 316, and the secondary opening 318 may be located in stage 506, and the primary openings 310, 312, and 314 may be located in stage 504. Although the nozzle 500 is shown as having three stages 504, 506, and 508, use of a nozzle having two or more stages may also envisioned.

In accordance with the embodiments described herein, an improved ejector such as the ejector 120 having high entrainment ratio and reduced mixing length is presented. The turbo-machine 100 using such improved ejector 120 is also presented. In accordance with some embodiments, the ejector 120 includes the nozzle 214 having the secondary pilot inlet 212 and the nozzle outlet 218 having the plurality of primary openings 302-316 for discharging the primary fluid and the secondary opening 318 for discharging the secondary fluid. Advantageously, the kinetic energy of the discharged jets of the primary and secondary fluids may cause suction of the secondary fluid from the secondary fluid inlet 212 via the annular cavity 224 surrounding the nozzle 214. Moreover, as the primary fluid is discharged via a plurality of jets, surface area for interaction between primary fluid and the secondary fluid increases. This may result in increased suction of the secondary fluid thereby increasing an entrainment ratio. Furthermore, the discharge of the secondary fluid via the secondary opening 318 of the nozzle outlet 218 may also increase the shear layer interaction between the primary fluid and the secondary fluid resulting in further enhancement of the entrainment ratio. Accordingly, for a given amount of the primary fluid more amount the of the secondary fluid may be sucked by the ejector 120 in comparison to the conventional ejectors. Moreover, the discharge of the secondary fluid via the secondary opening 318 of the nozzle outlet 218 may cause faster mixing of the primary fluid and the secondary fluid due to the increased shear layer interaction between the primary fluid and the secondary fluid leading to the shorter mixing length in comparison to conventional ejectors. This results in an improvement in the performance of the ejector 120. Accordingly, the mixing length may also be shortened. Due to the shortened mixing length, the ejector 120 having reduced length in comparison to conventional ejectors may be manufactured resulting on material and cost savings. The ejector such as the ejector 120 may be employed for variety of applications including, but not limited to, supplying sump pressurization air by utilizing ambient air or a fluid from the forward stage of compressor, pressurizing a balance piston cavity, creating suction in a central vent tube of the gas turbine during start-up or idle condition, supplying compressor bore flow, facilitating cooling of one or more parts for example turbine casing, turbine disks, preventing built-up of ice on booster nose and/or nacelle, or combinations thereof.

It will be appreciated that variants of the above disclosed and other features and functions, or alternatives thereof, may be combined to create many other different applications. Various unanticipated alternatives, modifications, variations, or improvements therein may be subsequently made by those skilled in the art and are also intended to be encompassed by the following claims.

The invention claimed is:

1. An ejector comprising:
a primary fluid inlet to receive a primary fluid;
a secondary fluid inlet to receive a secondary fluid; and
a nozzle fluidly coupled to the primary fluid inlet and the secondary fluid inlet,
wherein the nozzle comprises:
a secondary pilot inlet to receive at least a portion of the secondary fluid from the secondary fluid inlet; and
a nozzle outlet comprising a plurality of primary openings for discharging the primary fluid and a secondary opening for discharging the secondary fluid,
wherein the plurality of primary openings are disposed around the secondary opening,
wherein the nozzle comprises a tip portion that includes the nozzle outlet at a terminal end thereof, and that has a secondary fluid conduit passing therethrough for the secondary fluid to pass to the secondary opening, and
wherein the secondary fluid conduit continuously decreases in flow area towards the terminal end.

2. The ejector of claim 1, wherein the primary fluid inlet is fluidly coupled to a high-pressure source to receive the primary fluid, and wherein the secondary fluid inlet is fluidly coupled to a low-pressure source to receive the secondary fluid.

3. The ejector of claim 1, wherein the nozzle further comprises a plurality of primary conduits fluidly coupling the primary fluid inlet to the plurality of primary openings of the nozzle outlet.

4. The ejector of claim 1, wherein the plurality of primary openings and the secondary opening are arranged such that the secondary opening is disposed between one or more of the plurality of primary openings.

5. The ejector of claim 1, wherein the secondary fluid conduit decreases in diameter towards the terminal end.

6. The ejector of claim 1, wherein the plurality of primary openings and the secondary opening comprise a circular shape, a square shape, a rectangular shape, a hexagonal shape, a trapezoidal shape, or combinations thereof.

7. The ejector of claim 1, wherein the plurality of primary openings and the secondary opening are staggered in an axial direction of the ejector.

8. The ejector of claim 1, wherein the plurality of primary openings and the secondary opening are arranged in two or more stages staggered in an axial direction of the ejector.

9. The ejector of claim 1, wherein the plurality of primary openings and the secondary opening are arranged such that the secondary opening is surrounded by the primary openings.

10. An ejector comprising:
a fluid suction section;
a mixing tube; and
a diffuser,
wherein the fluid suction section comprises:
a primary fluid inlet to receive a primary fluid;
a secondary fluid inlet to receive a secondary fluid;
a nozzle fluidly coupled to the primary fluid inlet and the secondary fluid inlet,
wherein the nozzle comprises:
a secondary pilot inlet to receive at least a portion of the secondary fluid from the secondary fluid inlet; and
a nozzle outlet comprising a plurality of primary openings for discharging the primary fluid and a secondary opening for discharging the secondary fluid;
wherein the mixing tube is fluidly coupled to the fluid suction section and is configured to:
receive the primary fluid and the secondary fluid from the fluid suction section; and
mix the primary fluid with the secondary fluid to form a mixed fluid stream;
wherein the diffuser fluidly is coupled to the mixing tube to discharge the mixed fluid stream,
wherein the plurality of primary openings are disposed around the secondary opening,
wherein the nozzle comprises a tip portion that includes the nozzle outlet at a terminal end thereof, and that has a secondary fluid conduit passing therethrough for the secondary fluid to pass to the secondary opening, and wherein the secondary fluid conduit continuously decreases in flow area towards the terminal end.

11. The ejector of claim 10, wherein the secondary fluid conduit decreases in diameter towards the terminal end.

12. The ejector of claim 10, wherein the nozzle further comprises a plurality of primary conduits fluidly coupling the primary fluid inlet to the plurality of primary openings of the nozzle outlet.

13. The ejector of claim 10, wherein the plurality of primary openings and the secondary opening are staggered in an axial direction of the ejector.

14. A turbo-machine, comprising:
a high-pressure source of a primary fluid;
a low-pressure source of a secondary fluid;
a target unit; and
an ejector fluidly coupled to the high-pressure source, the low-pressure source, and the target unit,
wherein the ejector comprises:
a primary fluid inlet fluidly coupled to the high-pressure source to receive the primary fluid;
a secondary fluid inlet fluidly coupled to the low-pressure source to receive the secondary fluid; and
a nozzle fluidly coupled to the primary fluid inlet and the secondary fluid inlet,
wherein the nozzle comprises:
a secondary pilot inlet to receive at least a portion of the secondary fluid from the secondary fluid inlet; and
a nozzle outlet comprising a plurality of primary openings for discharging the primary fluid and a secondary opening for discharging the secondary fluid,
wherein the plurality of primary openings are disposed around the secondary opening,
wherein the nozzle comprises a tip portion that includes the nozzle outlet at a terminal end thereof, and that has a secondary fluid conduit passing therethrough for the secondary fluid to pass to the secondary opening, and
wherein the secondary fluid conduit continuously decreases in flow area towards the terminal end.

15. The turbo-machine of claim 14, wherein the plurality of primary openings and the secondary opening are arranged such that the secondary opening is surrounded by the primary openings.

16. The turbo-machine of claim 14, wherein the secondary fluid conduit decreases in diameter towards the terminal end.

17. The turbo-machine of claim 14, wherein the high-pressure source comprises a high-pressure compressor.

18. The turbo-machine of claim 14, wherein the low-pressure source comprises a low-pressure compressor, an inlet for ambient air, or a combination thereof.

19. The turbo-machine of claim 14, wherein the target unit comprises an oil sump, a balance piston, a casing of a turbine, a center frame of a turbine, or combinations thereof.

* * * * *